Sept. 7, 1965 P. W. GEERY 3,205,458
SEMI-CONDUCTOR MODULATOR CIRCUIT
Filed July 25, 1962 4 Sheets-Sheet 1

INVENTOR.
PAUL W. GEERY
BY
Philip S. Schmidt
AGENT

Sept. 7, 1965 P. W. GEERY 3,205,458

SEMI-CONDUCTOR MODULATOR CIRCUIT

Filed July 25, 1962 4 Sheets-Sheet 2

SEMI-CONDUCTOR MODULATOR CIRCUIT

Filed July 25, 1962 4 Sheets-Sheet 3

United States Patent Office 3,205,458

Patented Sept. 7, 1965

3,205,458

SEMI-CONDUCTOR MODULATOR CIRCUIT

Paul W. Geery, Houston, Tex., assignor, by mesne assignments, to Dresser SIE, Inc., Houston, Tex., a corporation of Delaware Filed July 25, 1962, Ser. No. 212,228
3 Claims. (Cl. 332—52)

My invention relates to variable resistance circuits, and more particularly to circuits for presenting a value of resistance between a pair of output terminals that is a function of the value of control potential applied to a pair of control potential terminals.

Circuits of this sort are widely useful in the electronic arts, except to the extent that they are subject to limitations of performance (such as frequency and linearity), or constraints of environment (such as temperature and shock), or considerations of cost (such as complexity or use of expensive components).

It is accordingly an object of my invention to provide a circuit for presenting a value of resistance between a pair of output terminals that is a function of the value of control potential applied to a pair of control potential terminals, which is operable over a wide frequency range, and which is linear over a substantial range of input voltage.

It is another object of my invention to provide a variable resistance circuit of the type discussed above in which environmental effects, such as temperature variation, are minimized or eliminated.

It is another object of my invention to provide a variable resistance circuit of the type discussed above which is low in cost because it uses a minimum number of components, and because none of the components required is expensive.

It is a further object of my invention to provide an attenuator circuit in which a portion thereof is a resistance circuit of the type discusesd above, and which embraces the advantages enumerated.

It is a still further object of my invention to provide an automatic gain control circuit for an amplifying system in which the gain-control element includes a resistance circuit of the type discussed above, and which embraces the advantages enumerated.

The foregoing and other objects of my invention will become more readily apparent from the following description, taken in conjunction with the accompanying drawings in which.

Figure 1:
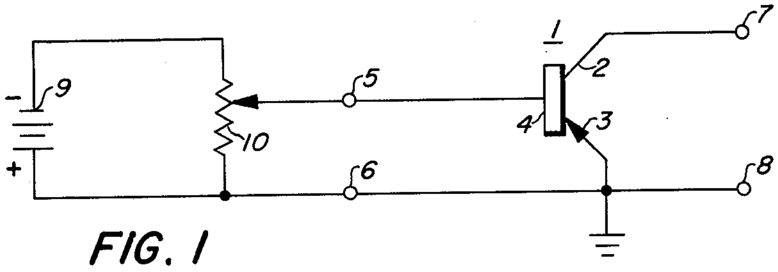
FIG. 1 is a schematic wiring diagram showing a circuit in which a value of resistance is presented between a pair of output terminals that is a function of the value of control potential applied to a pair of control potential terminals.
Figure 2:
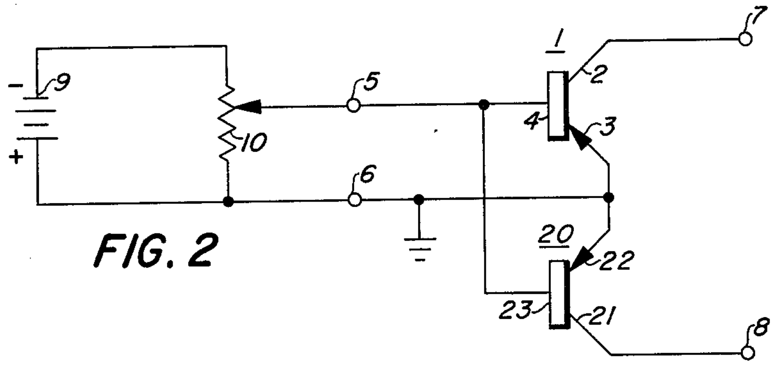
FIG. 2 is a schematic wiring diagram of another embodiment of my invention which serves the same purpose as the embodiment as FIG. 1, but wherein the effects of temperature variation are minimized or eliminated.
Figure 3:
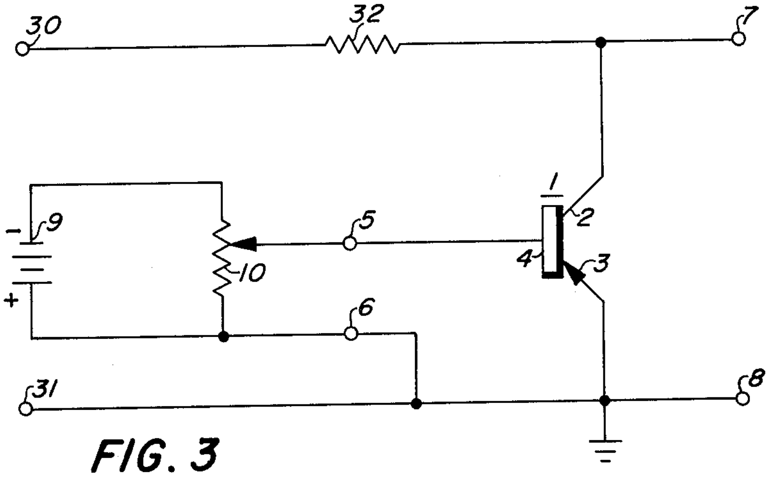
FIG. 3 is a schematic wiring diagram of an attenuator circuit in accordance with my invention.

The reference numerals used in the figures are drawn from a block of numbers reserved for first use in each figure; that is, reference numbers 1–19 are reserved for first use in FIG. 1, 20–29 for FIG. 2, 30–39 for FIG. 3, and so on.

Referring now to FIG. 1, there is shown, in accordance with my invention, semi-conductive means 1 having at least a first element 2, a second element 3, and a base element 4. Semi-conductive means 1 may be a transistor of either the germanium or silicon type. As drawn, first element 2 may be the collector, and second element 3 may be the emitter, of a PNP-type transistor, but I have found that my invention works substantially as well if the emitter and collector are interchanged. I therefore intend throughout this specification and in the appended claims for "first element" to apply to a collector or emitter as desired, and "second element" to refer to an emitter or collector, as the case may be.

Further in accordance with my invention, I may provide a pair of control potential terminals 5 and 6, and a pair of output terminals 7 and 8. Terminals 6 and 8 are connected together and to second element 3 to form a plane of reference potential, indicated conventionally by a ground symbol.

I may also provide a source of control potential. The source may be a battery 9 and potentiometer means 10 for adjusting the magnitude of the control potential, the resultant control potential for any particular setting being applied to control potential terminals 5 and 6. While I have illustrated a battery source of control potential, those skilled in the art can readily understand that the control potential source may be any form of D.-C. or A.-C. potential.

I have found that with zero control potential applied across control potential terminals 5 and 6, and with common types of transistors employed for semi-conductive means 1, a resistance of several thousand ohms is presented between output terminals 7 and 8, provided the peak potential between elements 2 and 3 is kept below the "foot" of the unidirectional characteristic curve. By applying a bias current from the source of control potential 9 to the base element 4 in the forward, or conducting, direction with respect to the second (here the emitter) element 3 of semi-conductor means 1, the value of resistance presented between output terminals 7 and 8 can be decreased to as little as 1/1000 of its zero control potential value.

As can be understood by those skilled in the art, an NPN transistor may be substituted directly for the PNP type shown if the polarity of the control potential is reversed from that shown. This interchangeability feature applies not only to FIG. 1, but also to the other embodiments of my invention described below and shown in FIGS. 2 through 8. It can also be understood by those skilled in the art that my invention affords a variable resistance action, wherein the resistance value presented between output terminals 7 and 8 can be selected at a location remove from semi-conductive means 1.

The embodiment of my invention diagrammed in FIG. 2 performs the same major function as the embodiment as FIG. 1, but provides substantially complete freedom from temperature variation effects on the semi-conductive means. As shown in FIG. 2, there are provided a first semi-conductive means 1 having at least a first element 2, a second element 3, and a base element 4; and a second semi-conductive means 20 having at least a first element 21, a second element 22, and a base element 23. There are also provided a pair (5 and 6) of control potential terminals; a pair (7 and 8) of output terminals; and a source of control potential including battery 9 and potentiometer 10, the selected value of control potential being applied to control potential terminals 5 and 6.

The first and second semi-conductive means 1 and 20 are arranged in series opposition, with their respective second elements 3 and 22 (shown in FIG. 2 for illustrative purposes as emitters of PNP transistors), connected together and to control potential terminal 6. This common connection forms a plane of reference potential, indicated conventionally by a ground symbol. The first elements 2 and 21 of semi-conductive means 1 and 20 are respectively connected to output terminals 7 and 8. Because of the series opposition connection of semi-conductive means 1 and 20, the effect of a temperature variation on one of the semi-conductive means is compensated by a substantially equal and opposite change in the other. The value of resistance presented between output terminals 7 and 8 is therefore a function of the value of control potential applied to terminals 5 and 6, with negligible effect from temperature variations being experienced.

The broad concept of my invention may also be embodied in the attenuator circuit shown in FIG. 3. As before, I provided semi-conductive means 1 having at least a first element 2, a second element 3, and a base element 4. A source of control potential including battery 9 and a potentiometer 10 may also be provided, the resultant control potential being applied across control potential terminals 5 and 6. There are also provided output terminals 7 and 8 and input terminals 30 and 31.

Any suitable input signal may be applied to input terminals 30 and 31. Between input terminal 30 and first element 2 of semi-conductive means 1, a first impedance means, indicated here for illustrative purposes as resistor 32, may be connectively inserted. A voltage divider amounting to an L-pad attenuator is therefore formed by the series connection of resistor 32 and the resistance presented between first element 2 and second element 3 of semi-conductive means 1. With this circuit, constructed in accordance with my invention, it is possible to adjust potentiometer 10 to produce a constant output signal between output terminals 7 and 8 when the input signal applied to input terminals 30 and 31 is varied; or conversely, to vary the output signal across output terminals 7 and 8 when the input signal applied between input terminals 30 and 31 is held constant.

Figure 4:
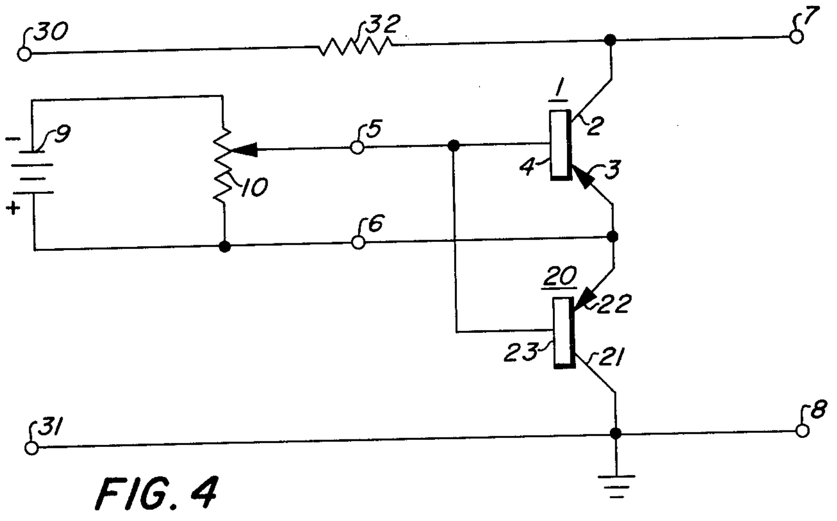
FIG. 4 is a schematic wiring diagram of an attenuator circuit in accordance with my invention, but wherein the effects of temperature variation are minimized or eliminated.

Attenuator action improved over that of FIG. 3 is provided by the embodiment of my invention shown in FIG. 4. In FIG. 4, there are provided a first semi-conductive means 1 having a first element 2, a second element 3, and a base element 4; and second semi-conductive means 20 having a first element 21, second element 22, and base element 23. The second element 3 of semi-conductive means 1 is connected to the second element 22 of second semi-conductive means 20, and this common connection is also connected to control potential termial 6. First elements 2 and 21 of semi-conductive means 1 and 20, respectively, are connected to output terminals 7 and 8, respectively; and base elements 4 and 23 are connected together and thence to control potential terminal 5. There are also provided input terminals 30 and 31, the latter of these being connected to output terminal 8 to form a plane of reference potential, indicated conventionally by a ground symbol. Connected between input terminal 30 and output terminal 7 is an impedance means, shown in this embodiment as resistor 32. As can be appreciated by those skilled in the art, the series connection which includes resistor 32, the resistance between elements 2 and 3 of semi-conductive means 1, and the resistance between elements 22 and 21 of second semi-conductive means 20 constitutes a voltage divider in the form of an L-pad attenuator; and the amount of attenuation is controllable by means of potentiometer 10. The series opposition connection of semi-conductive means 1 and 20 provides substantial freedom from temperature variation effects.

Figure 5:
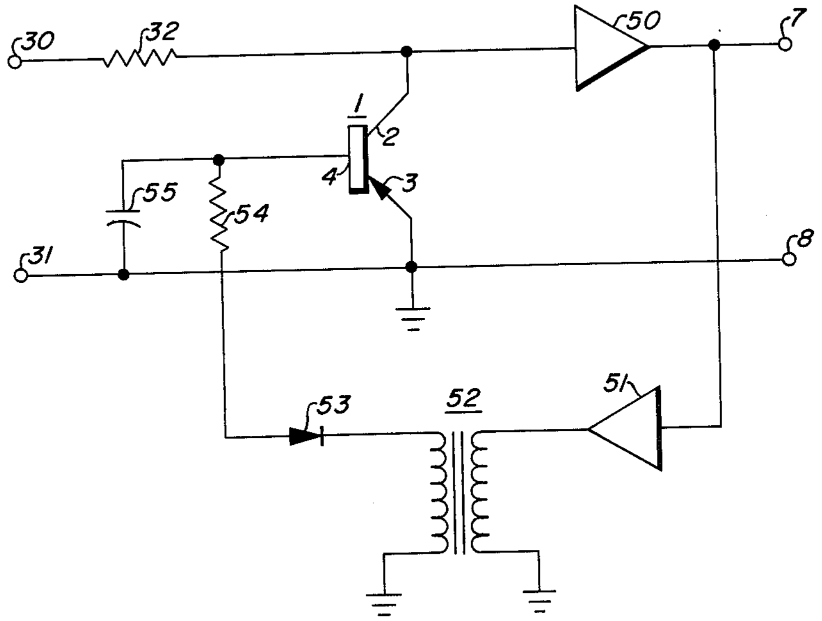
FIG. 5 is a schematic wiring diagram showing an automatic gain control circuit for an amplifying system in accordance with my invention.

In the automatic gain control circuit shown in FIG. 5, there is provided, as previously, a series connection of impedance means, shown here as resistor 32, and the resistance presented between the first and second elements 2 and 3 of semi-conductive means 1 to form a voltage divider having the configuraton of an L-pad attenuator. This series connection, or attenuator, is connected across input terminals 30 and 31, as in FIG. 3. In the case of FIG. 5, however, the attenuator output is fed into the input of amplifying means 50. Amplifying means 50 is shown schematically, it being understood according to convention that the output of amplifying means 50 appears across output terminals 7 and 8. Terminal 8 is connected to input terminal 31 to establish a plane of reference potential, indicated conventionally by a ground symbol.

The output signal from amplifying means 50, in addition to being connected to output terminal 7, may be connected to supplementary amplifying means 51. The output of amplifying means 51 may be fed through a suitable transformer 52, through rectifying means 53 which removes the D.-C. component from the output signal, through an integrating circuit composed of series resistor 54 and shunt capacitor 55, to base element 4 of semi-conductive means 1.

In operation, a change in signal potential between output terminals 7 and 8 is amplified by supplementary amplifying means 51, is fed through 52, and is converted to a D.-C. signal by rectifier 53. After integration, the D.-C. signal applied to base element 4 causes the resistance value presented between elements 2 and 3 of semi-conductive means to change in the sense opposite to the change at output terminal 7. A change in the signal potential applied to amplifying means 50 therefore occurs, the sense of this change being opposite to the change in output which generated the corrective action. The circuit thus functions as an automatic gain control circuit having a minimum of components, and the time constant can be readily adjusted because the control element is substantially resistive in nature over a broad range of frequencies. As those skilled in the art can appreciate, supplementary amplifying means 51 may not be required in some circuit applications; and integration may likewise prove unneeded in some instances.

Figure 6:
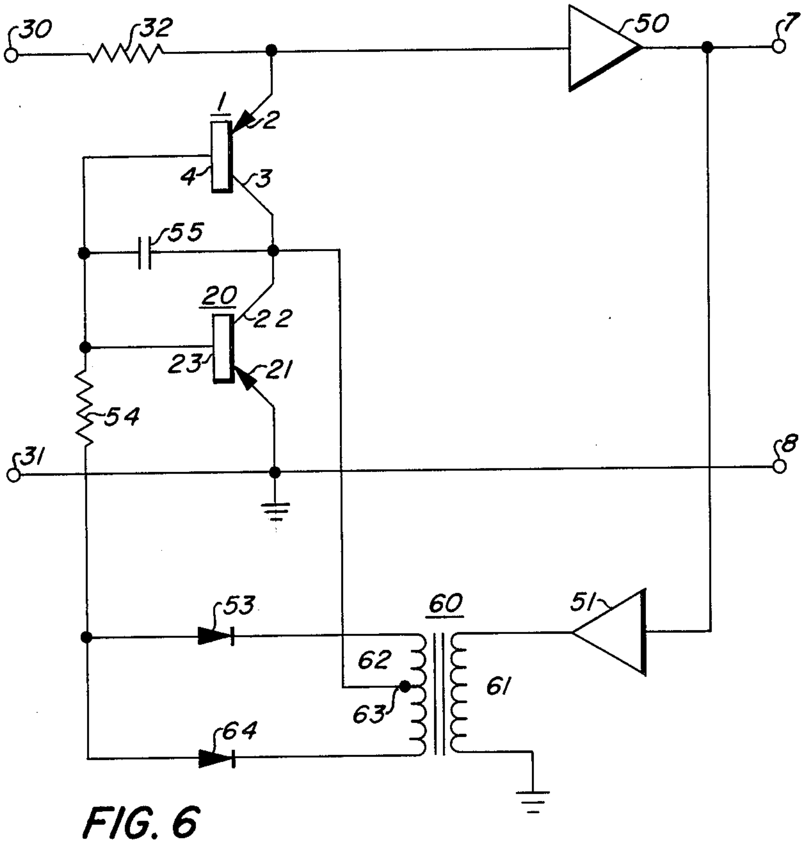
FIG. 6 is a schematic wiring diagram showing another embodiment of an automatic gain control circuit for an amplifying system in accordance with my invention, but wherein the effects of temperature variation are minimized or eliminated.

The arrangement of FIG. 6 is similar to that of FIG. 5, in that there are provided input terminals 30 and 31; output terminals 7 and 8; amplifying means 50; supplementary amplifying means 51; and an integrating network composed of resistor 54 and capacitor 55. As in FIG. 5, input terminal 31 is connected to output terminal 8 to form a plane of reference potential, indicated conventionally by a ground symbol. In FIG. 6, however, there are provided a first semi-conductive means 1 having a first element 2, a second element 3, and a base element 4, and a second semi-conductive means 20 having a first element 21, a second element 22, and a base element 23. There are also provided a transformer 60 having a primary 61, a secondary 62, and a center-tap connection 63 on secondary 62. The outer ends of winding 62 are respectively connected to diode means 53 and 64. The outputs of diodes 53 and 64 are connected in parallel and are fed through the integrating means comprising resistor 54 and capacitor 55 to the parallel-connected bases 4 and 23 of semi-conductive means 1 and 20, respectively.

There is thus formed a voltage divider having the configuration of an L-pad attenuator, which comprises the series connection of resistor 32, the resistance appearing between elements 2 and 3 of semi-conductive means 1, and the resistance appearing between first and second elements 21 and 22 of second semi-conductive means 20. An input signal applied to input terminals 30 and 31 is consequently subjected to attenuator action before reaching amplifying means 50. A change in the output of amplifying means 50 therefore causes a change in the opposite sense to be applied to the base elements 4 and 23 of first and second semi-conductive means 1 and 20; and the input fed to amplifying means 50 is therefore changed in the opposite sense to the change in output which initiated the automatic gain control action.

Figure 7:
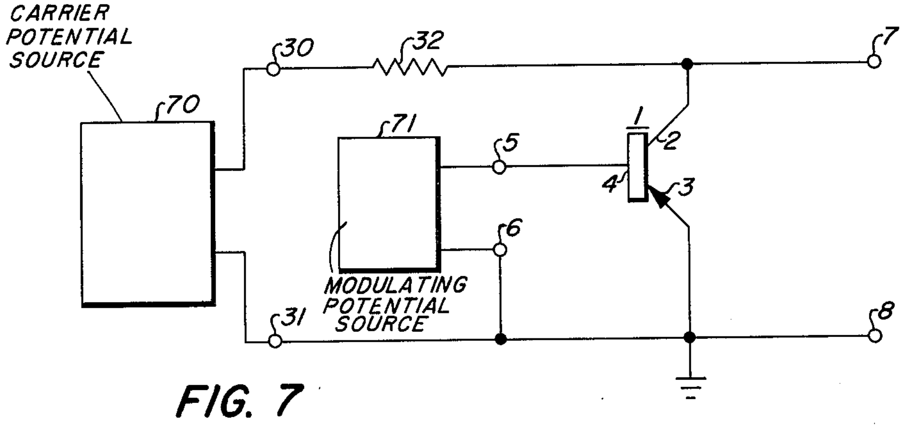
FIG. 7 is a schematic wiring diagram showing a modulator circuit in accordance with my invention.

There is shown in FIG. 7 an embodiment of my invention which is adapted to modulate a carrier potential. Here I provide a semi-conductive means 1 having at least a first element 2, a second element 3, and a base element 4; input terminals 30 and 31; output terminals 7 and 8; and modulating potential terminals 5 and 6. Input terminal 30 is connected to output terminal 7 through an impedance means, shown here for illustrative purposes as resistor 32. Input terminal 31 is connected to output terminal 8 to form a plane of reference potential, indicated conventionally by a ground symbol. Modulating potential terminals 5 and 6 are respectively connected to base element 4 and the plane of reference potential.

In accordance with my invention I may apply carrier potential from a source 70, which may be of any suitable type, between terminals 30 and 31. Across modulating potential terminals 5 and 6, I apply a modulating potential from a source 71, which may likewise be of any suitable type. The modulating frequency is usually lower than the carrier frequency. The modulating potential serves the same purpose and operates in the same fashion as the control voltage in FIG. 1; that is, the resistance presented between the first and second elements 2 and 3 of semi-conductive means 1 varies with the amplitude of the modulating potential, and as the resistance presented decreases, less of the carrier potential reaches the output terminals. I prefer to connect an impedance means, such as resistor 32, between input terminal 30 and first element 2 of semi-conductive means 1, but those skilled in the art can readily apprepciate that resistor 32 may be omitted if the shunting effect caused by the resistance presented between first and second elements 2 and 3, respectively, of semi-conductive means 1, can be tolerated by source 70.

I have found that the value of modulating potential required to modulate a carrier signal is very small because the impedance of the modulation circuit is high; and that the power consumed is extremely small. This modulating circuit is particularly advantageous in that no source of D. C. power is required, and the frequency response at reasonable frequencies is determined primarily by external factors, such as input coupling transformers, rather than by any portion of the modulating circuit itself.

Figure 8:
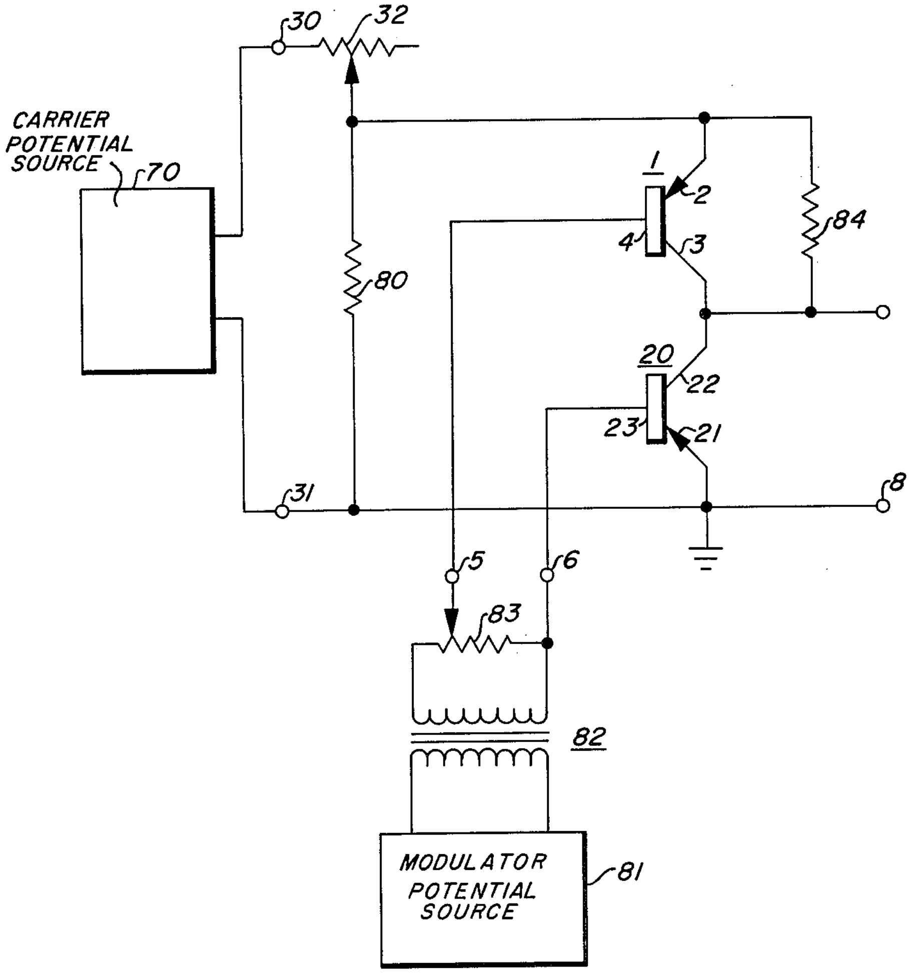
FIG. 8 is a schematic wiring diagram showing another embodiment of a modulator circuit in accordance with my invention, wherein the effects of temperature variation are minimized or eliminated.

The embodiment of my invention shown in FIG. 8 resembles that shown in FIG. 7, in that there are provided input terminals 30 and 31, output terminals 7 and 8, and modulation potential terminals 5 and 6. In FIG. 8, however, I provide, in addition to a first semi-conductive means 1 having at least a first element 2, a second element 3, and a base element 4, a second semi-conductive means 20 having at least a first element 21, a second element 22, and a base element 23. I also provide an impedance means, such as resistor 32 (here shown adjustable), connected between input terminal 30 and first element 2 of first semi-conductive means 1. I may also include a shunt resistor 80 which serves to stabilize the load on the source 70 of carrier potential connected across input terminals 30 and 31. I may derive the modulating potential from a source 81, connecting it to modulating potential terminals through transformer 82 and potential-adjusting potentiometer 83.

As is apparent from the drawing, modulating potential terminals 5 and 6 are respectively connected to base elements 4 and 23. The modulating potential derived from potentiometer 83 therefore circulates around a path from modulating potential terminal 5; base element 4 and second element 3 of semi-conductive means 1; second element 22 and base element 23 of second semi-conductive means 20; and back to modulating potential terminal 6. The current flowing around this path affects the base bias of semi-conductive means 1 and 20 by disportionable amounts, because at one semi-conductive junction the bias is in a forward direction and in the other it is in a reverse direction. The direction of this bias reverses when the polarity of the modulating potential reverses. Thus one or the other of semi-conductive means 1 and 20 is performing the major portion of the resistance-presenting function at any given instant; yet the resistance value presented between first elements 2 and 21 of semi-conductive means 1 and 20, respectively, is a function of the value of modulating potential only. Since output terminal 7 is connected to the junction between second elements 3 and 22 of semi-conductive means 1 and 20, respectively, the magnitude of carrier potential appearing across output terminals 7 and 8 varies in accordance with the modulating potential applied to terminals 5 and 6.

Further in accordance with my invention, I may provide a second impedance means, such as resistor 84, connected across first element 2 and second element 3 of semi-conductive means 1. Some of the carrier voltage appearing across terminals 30 and 31 is therefore by-passed around the modulator circuit, and thus limits the degree of downward modulation. This is useful in some low-frequency applications of my invention. The advantage of the embodiment of my invention shown in FIG. 8 over that shown in FIG. 7 lies in the use of two semi-conductive means connected in series opposition, whereby the effects of temperature variation on one semi-conductive means are cancelled by equal but opposite effects on the other of the semi-conductive means.

While my invention has been described in connection with presently preferred embodiments thereof, it is to be understood that this description is illustrative only, and is not intended to limit my invention, the scope of which is defined by the appended claims.

What I claim is:

1. In a modulator circuit, the combination of
first and second semi-conductive means, each having at least first, second, and base elements;
the first said elements of said first and second semi-conductive means being connected together;
a pair of input terminals connected respectively to said second elements of said first and second semi-conductive means;
a source of carrier potential connected across said input terminals;
a pair of output terminals connected respectively to the connection joining said first elements, and to said second element of said second semi-conductive means;
a pair of modulating potential terminal respectively connected between said base elements; and
a source of modulating potential connected across said modulating potential terminals;
whereby the magnitude of said carrier potential appearing across said output terminals is modulated in accordance with said modulating potential.

2. The combination of claim 1 to which is added
first impedance means,
said first impedance means being connectively inserted between one of said input terminals and said second element of said first semi-conductive means.

3. The combination of claim 2 to which is added second impedance means, said second impedance means being connected from said second element of said first semi-conductive means to the common said connection between said first elements, whereby a portion of said carrier potential is by-passed around said semi-conductive means and therefore determines a lower limit of downward modulation.

References Cited by the Examiner

UNITED STATES PATENTS

| | | | |
|---|---|---|---|
| 2,544,211 | 3/51 | Barton | 330—29 |
| 2,801,300 | 7/57 | Crane et al. | 330—86 |
| 2,918,627 | 12/59 | Denz | 330—23 |
| 3,008,090 | 11/61 | Millis et al. | 332—52 |
| 3,096,492 | 7/63 | Yogt | 329—101 X |
| 3,101,455 | 8/63 | Masher | 329—101 X |

ROY LAKE, *Primary Examiner.*